UNITED STATES PATENT OFFICE.

BRUNO RICHARD SEIFERT, OF RADEBEUL, NEAR DRESDEN, GERMANY, ASSIGNOR TO CHEMISCHE FABRIK VON HEYDEN AKTIENGESELLSCHAFT, OF RADEBEUL, NEAR DRESDEN, GERMANY.

BISMUTH DISALICYLATE AND PROCESS OF MAKING SAME.

No. 809,533.      Specification of Letters Patent.      Patented Jan. 9, 1906.

Application filed October 10, 1905. Serial No. 282,150.

*To all whom it may concern:*

Be it known that I, BRUNO RICHARD SEIFERT, a subject of the King of Saxony, and a resident of Radebeul, near Dresden, Kingdom of Saxony, German Empire, have invented a new and useful Manufacture of Bismuth Disalicylate, of which the following is a specification.

Under the name of "bismuth salicylate" two preparations are to be had in the market. One of them, called "bismuth subsalicylate," answers to the chemical formula $O=Bi-OOC.CH_4OH$. This salt may be best and simply called "bismuth monosalicylate." The other one, the so-called "neutral bismuth salicylate," is said to correspond with the formula of the neutral salt $Bi=(OOC_6H_4OH)_3$. It consequently would have to be considered as bismuth trisalicylate. This product of the market is, however, by no means a chemical individual, but a mixture, and consists principally of much free salicylic acid and bismuth salicylate. Thiebault (*Chemiker-Zeitung*, 1901, *Repertorium* II, page 207) obtained a salt with one and one-half molecules of salicylic acid to one atom of bismuth

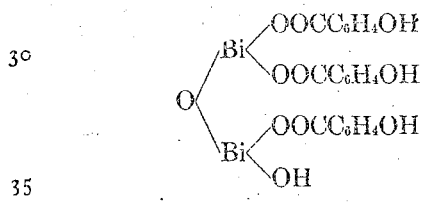

eventually with water of crystallization in the form of a reddish-gray powder by boiling a crystallized bismuth oxid specially prepared with salicylic acid and water. Causse (*Comptes rendus*, 1891, B. J., 112, page 1220; see also *Chemiker-Zeitung*, 1891, *Repertorium* I, page 162) has described the manufacture of a bismuth trisalicylate; but his product is no bismuth salicylate at all. It contains only free salicylic acid, for all salicylic acid contained in this product can be extracted by cold ether or alcohol. It is obvious that when proceeding according to Causse bismuth salicylate as final substance cannot be obtained at all, for Causse's reaction takes place in the presence of a solution of ammonium chlorid, and I have found that a solution of ammonium chlorid decomposes bismuth salicylate into bismuth oxychlorid and ammonium salicylate. I have found that the bismuth trisalicylate

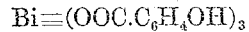

cannot exist in reality, but that it is possible to produce a disalicylate besides the monosalicylate already known and the one and one-half fold salicylate. When the normal bismuth salts of mineral acids—for instance, the bismuth nitrate—are caused to act on sodium salicylate, the bismuth trisalicylate is not obtained, as might be expected; but in consequence of the obvious impossibility of the existence of this salt a mixture of bismuth disalicylate, with free salicylic acid, is obtained, from which the bismuth disalicylate may be produced in a pure state if the salicylic acid is removed by extracting it by indifferent dissolving agents or by means of careful neutralization. If, however, removing of the salicylic acid by boiling with water is tried, the final product obtained is not bismuth disalicylate, but bismuth monosalicylate.

Example: Nine hundred and seventy parts of crystallized bismuth nitrate are brought together with an aqueous solution of one thousand and fifty parts of salicylate of sodium. After having stirred or triturated the mass for several hours a diluted aqueous solution of ammonia is added until the sour reaction has just disappeared. After filtering the residue is washed several times with cold water and dried at ordinary or only moderately-raised temperature. Instead of dissolving the free salicylic acid with ammonia the raw product of reaction may be filtered and deprived of free salicylic acid by extracting agents, such as alcohol, ether, chloroform. As when heated the disalicylate is decomposed by water and alcohol, the extraction in the cold is preferable. The bismuth disalicylate thus obtained is a white powder which contains two molecules of salicylic acid combined with one atom of bismuth, corresponding to the formula

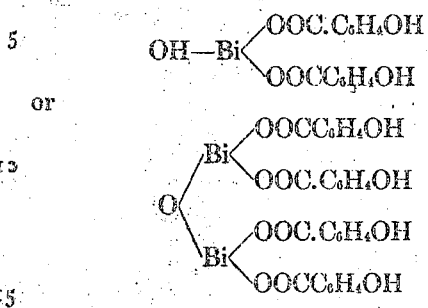

An extract prepared with cold water has a neutral reaction which proves that the product contains no free salicylic acid. Cold alcohol or ether do not split off salicylic acid from the salt. When boiled with water or treated with hot aqueous alcohol, half of the salicylic acid is split off from the salt under formation of the known bismuth monosalicylate.

For therapeutical use the new salt has especially two advantages: First, it contains more salicylic acid; second, half of its salicylic acid is split off very easily.

Having now particularly described and ascertained the nature of this invention and in what manner the same is to be performed, I declare that what I claim is—

1. The manufacture of bismuth disalicylate which consists in causing a normal bismuth salt to act on a solution of a salicylic salt, the base of which forms a soluble salt with the acid of the bismuth salt, and in removing the free salicylic acid from the product of reaction by neutralization or extraction with indifferent solvents at a temperature at which the bismuth disalicylate is not yet split up into salicylic acid and bismuth monosalicylate, substantially as and for the purpose specified.

2. As a new article of manufacture the new salt, bismuth disalicylate, a chemical combination of one atom of bismuth with two molecules of salicylic acid, forming a whitish powder of neutral reaction, which is split up into free salicylic acid and bismuth monosalicylate by boiling water, substantially as and for the purpose specified.

In testimony that I claim the foregoing as my invention I have signed my name, in presence of two witnesses, this 26th day of September, 1905.

BRUNO RICHARD SEIFERT.

Witnesses:
PAUL E. SCHILLING,
PAUL ARRAS.